US012362507B2

(12) United States Patent
Hirai

(10) Patent No.: US 12,362,507 B2
(45) Date of Patent: Jul. 15, 2025

(54) FIXING MEMBER AND BOARD CONNECTOR

(71) Applicant: SUMITOMO WIRING SYSTEMS, LTD., Mie (JP)

(72) Inventor: Kentaro Hirai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 396 days.

(21) Appl. No.: 17/981,681

(22) Filed: Nov. 7, 2022

(65) Prior Publication Data

US 2023/0163496 A1 May 25, 2023

(30) Foreign Application Priority Data

Nov. 24, 2021 (JP) ................................ 2021-190041

(51) Int. Cl.

*H01R 12/70* (2011.01)
*H01R 13/502* (2006.01)
*H01R 12/58* (2011.01)
*H01R 25/00* (2006.01)

(52) U.S. Cl.

CPC ....... *H01R 12/7023* (2013.01); *H01R 13/502* (2013.01); *H01R 12/58* (2013.01); *H01R 25/006* (2013.01)

(58) Field of Classification Search

CPC .. H01R 12/7023; H01R 13/502; H01R 12/58; H01R 25/006; H01R 12/724; H01R 12/7029; H01R 12/51

See application file for complete search history.

(56) References Cited

U.S. PATENT DOCUMENTS

| | | | | | |
|---|---|---|---|---|---|
| 5,334,049 | A * | 8/1994 | Kachlic | H01R 12/7029 | 439/552 |
| 5,632,649 | A * | 5/1997 | Spangler | H05K 7/12 | 439/567 |
| 2005/0221668 | A1* | 10/2005 | Hara | H01R 12/7029 | 439/567 |
| 2009/0305556 | A1* | 12/2009 | Kawahara | H01R 12/7029 | 439/544 |
| 2018/0337482 | A1* | 11/2018 | Teruki | H01R 13/506 | |

(Continued)

FOREIGN PATENT DOCUMENTS

| | | | |
|---|---|---|---|
| JP | H02-012169 | U | 1/1990 |
| JP | 2004-296369 | A | 10/2004 |

*Primary Examiner* — Abdullah A Riyami
*Assistant Examiner* — Nader J Alhawamdeh
(74) *Attorney, Agent, or Firm* — Venjuris, P.C.

(57) ABSTRACT

A fixing member 40 includes a housing mounting portion 60 to be mounted into a housing 20 and a board locking portion 70 projecting from the housing mounting portion 60 and to be locked to a circuit board 12. The board locking portion 70 includes a resiliently deformable spring portion 71 formed by bending a part protruding in a width direction intersecting a projecting direction from the housing mounting portion 60 and a board contact portion 71 disposed on a side closer to a tip than the spring portion 71 in a projecting direction of the board locking portion 70 and configured to contact the circuit board. The spring portion 71 is arranged inwardly in the width direction of both end parts on outer sides in the width direction of the housing mounting portion 60 in a developed state of the spring portion 71.

8 Claims, 12 Drawing Sheets

(56) References Cited

U.S. PATENT DOCUMENTS

| | | | | |
|---|---|---|---|---|
| 2019/0334287 | A1* | 10/2019 | Ito | H01R 13/639 |
| 2023/0163496 | A1* | 5/2023 | Hirai | H01R 12/7023 439/625 |
| 2024/0380143 | A1* | 11/2024 | Hara | H01R 12/62 |

* cited by examiner

FIXING MEMBER AND BOARD CONNECTOR

CROSS-REFERENCE TO RELATED APPLICATIONS

This application is based on and claims priority from Japanese Patent Application No. 2021-190041, filed on Nov. 24, 2021, with the Japan Patent Office, the disclosure of which is incorporated herein in its entirety by reference.

TECHNICAL FIELD

The present disclosure relates to a fixing member and a board connector.

BACKGROUND

Japanese Patent Laid-open Publication No. 2004-296369 discloses a connector fastener for fixing a connector to a circuit board. This connector fastener is manufactured by press-working a metal plate material.

A connector fixing member disclosed in Japanese Patent Laid-open Publication No. 2005-285654 is in the form of a flat plate and includes a press-in stopper portion configured to contact an insulator, a fixing spring portion serving as a leg portion for fixing a connector to a mounting object, and a bent tab forming a branched portion extending in the same direction as the leg portion. After the fixing member is inserted into an accommodating portion of the insulator, a bent portion is formed by bending a free end of the branched portion and the accommodating portion is sandwiched by the bent portion and the press-in stopper portion.

A connector mounting bracket disclosed in Japanese Utility Model Laid-open Publication No. H02-012169 includes a stopper portion wider than a mounting hole of an insulator, a press-fit portion to be fit into the mounting hole and a pair of resilient ridge pieces extending downward from the press-fit portion. The pair of resilient ridge pieces are bent into a V shape in mutually opposite directions along a plate thickness direction.

SUMMARY

The fixing member disclosed in Japanese Patent Laid-open Publication Nos. 2004-296369 and 2005-285654, and Japanese Utility Model Laid-open Publication No. H02-012169 includes a spring part to be fixed to the circuit board. As a measure against deformation at the time of inserting the fixing member into the circuit board, it is desirable to set a large spring restoring force of the spring part. For example, it is considered to increase a spring length by causing the spring part to protrude in a width direction. However, in such a configuration, the fixing member is enlarged in the width direction and material cost increases.

Accordingly, the present disclosure provides a technique capable of reducing the material cost of a fixing member.

The present disclosure is directed to a fixing member with a housing mounting portion to be mounted into a housing and a board locking portion projecting from the housing mounting portion, the board locking portion being locked to a circuit board, the board locking portion including a resiliently deformable spring portion formed by bending a part protruding in a width direction intersecting a projecting direction from the housing mounting portion and a board contact portion disposed on a side closer to a tip than the spring portion in the projecting direction, the board contact portion contacting the circuit board, and the spring portion being arranged inwardly in the width direction of both end parts on outer sides in the width direction of the housing mounting portion in a developed state of the spring portion.

The present disclosure is directed to a board connector with the fixing member and the housing, the housing including a supporting portion for supporting the fixing member, the supporting portion having a thickness in a plate thickness direction of the housing mounting portion with the fixing member assembled, and the spring portion being disposed in a thickness range of the supporting portion in the plate thickness direction of the housing mounting portion.

According to the present disclosure, it is possible to reduce the material cost of a fixing member.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
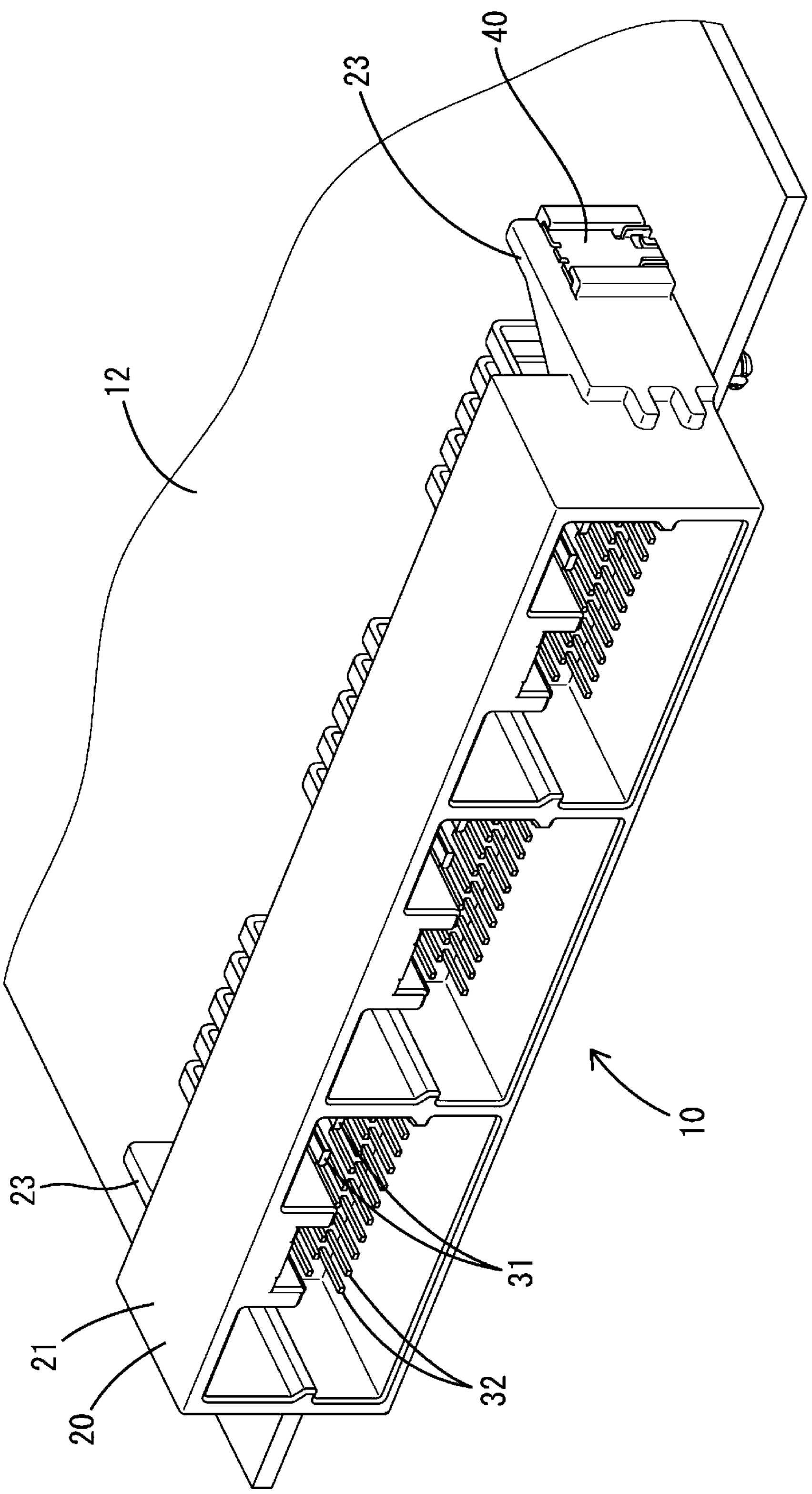
FIG. 1 is a perspective view showing a state where a board connector of one embodiment is fixed to a circuit board when viewed from front.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

[Description of Embodiments of Present Disclosure]

First, embodiments of the present disclosure are listed and described.

(1) The fixing member of the present disclosure is provided with a housing mounting portion to be mounted into a housing and a board locking portion projecting from the housing mounting portion, the board locking portion being locked to a circuit board, the board locking portion including a resiliently deformable spring portion formed by bending a part protruding in a width direction intersecting a projecting direction from the housing mounting portion and a board contact portion disposed on a side closer to a tip than the spring portion in the projecting direction, the board contact portion contacting the circuit board, and the spring portion being arranged inwardly in the width direction of both end parts on outer sides in the width direction of the housing mounting portion in a developed state of the spring portion.

According to the configuration of the present disclosure, since the spring portion is arranged inwardly in the width direction of the both end parts on the outer sides in the width direction of the housing mounting portion in the developed state of the spring portion, a size of the fixing member can be reduced.

Therefore, the material cost of the fixing member can be reduced.

(2) Preferably, the spring portion is shaped to extend from one end to another end and includes bent portions on both end parts in an extending direction.

According to this configuration, the spring portion is more easily deflected and deformed.

(3) Preferably, the bent portions are formed along a virtual line passing through the both end parts in the extending direction of the spring portion.

According to this configuration, the bent portions of the spring portion can be formed by one bending via the virtual line and a manufacturing process can be simplified.

(4) Preferably, the spring portion is shaped by being bent and raised from a planar flat plate portion including the housing mounting portion and the board locking portion.

According to this configuration, since the spring portion is formed by bending and raising a part protruding from a flat plate-like member (flat plate portion) in the fixing member, the manufacturing process can be simplified.

The board connector of the present disclosure is provided with the fixing member and the housing, the housing including a supporting portion for supporting the fixing member, the supporting portion having a thickness in a plate thickness direction of the housing mounting portion with the fixing member assembled, and the spring portion being disposed in a thickness range of the supporting portion in the plate thickness direction of the housing mounting portion.

According to the configuration of the present disclosure, since the spring portion does not project further outward than the supporting portion, a size of the connector can be reduced.

[Details of Embodiment of Present Disclosure]

Figure 2:
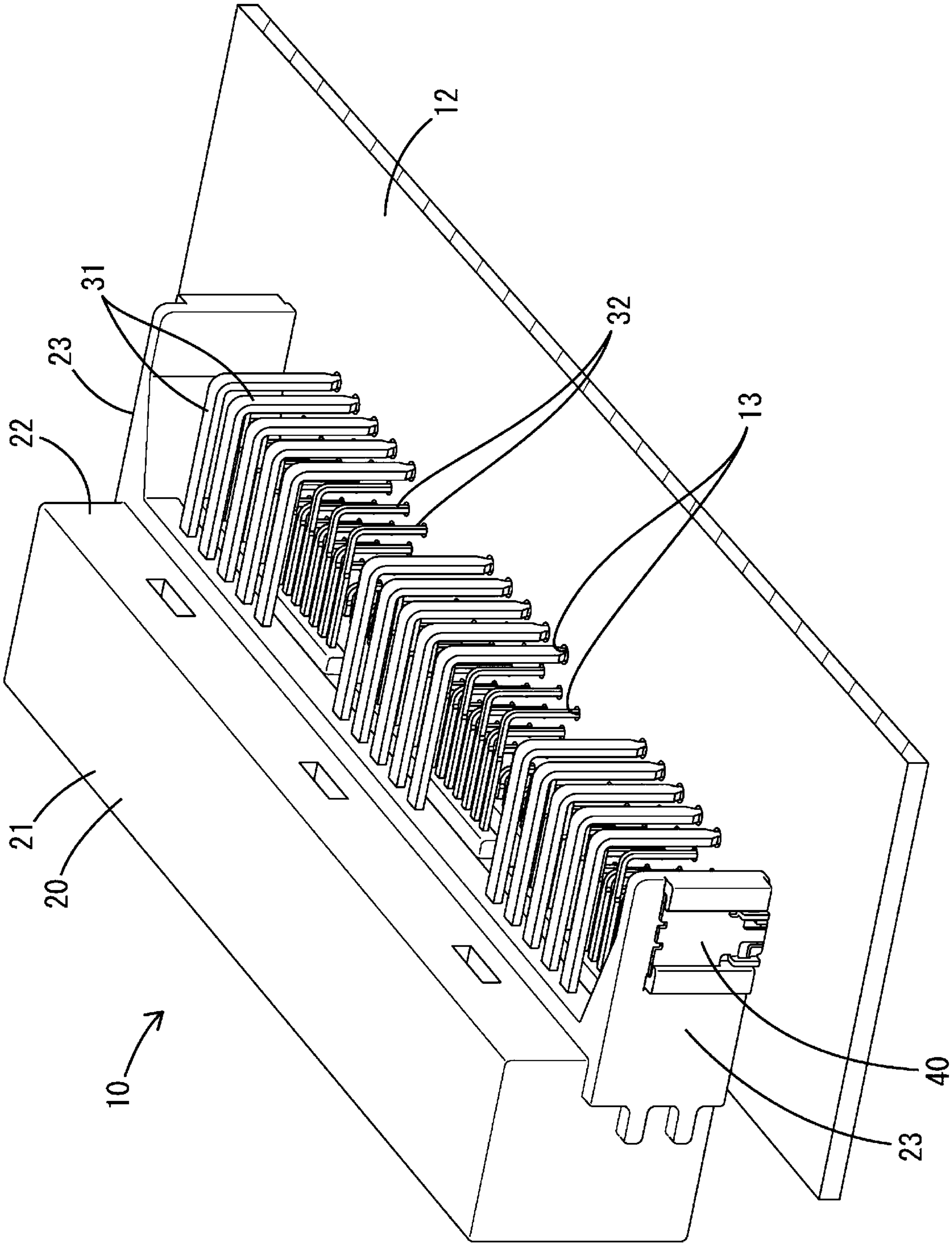
FIG. 2 is a perspective view showing the state where the board connector is fixed to the circuit board when viewed from behind.
Figure 3:
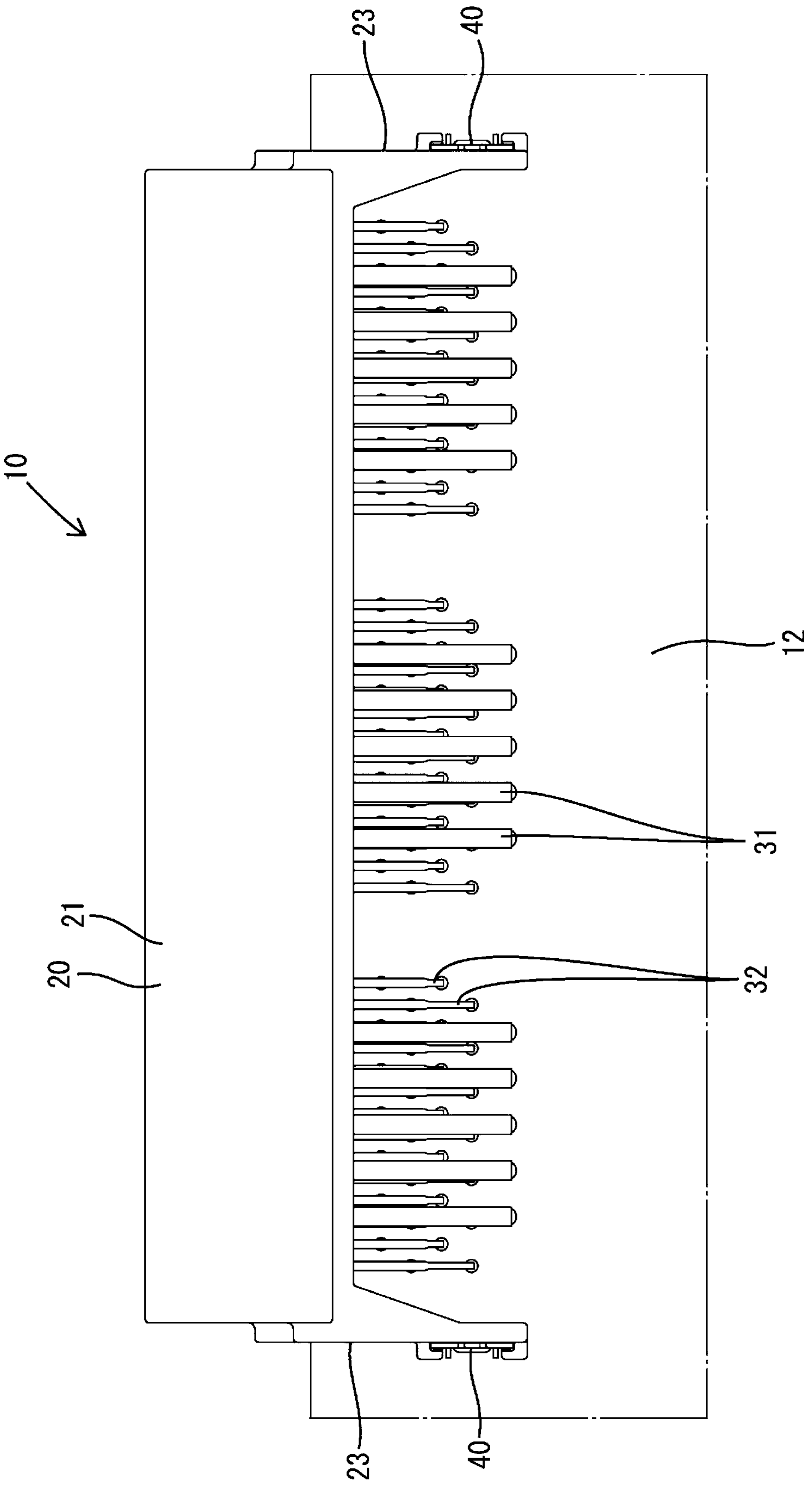
FIG. 3 is a plan view showing the state where the board connector is fixed to the circuit board.
Figure 4:
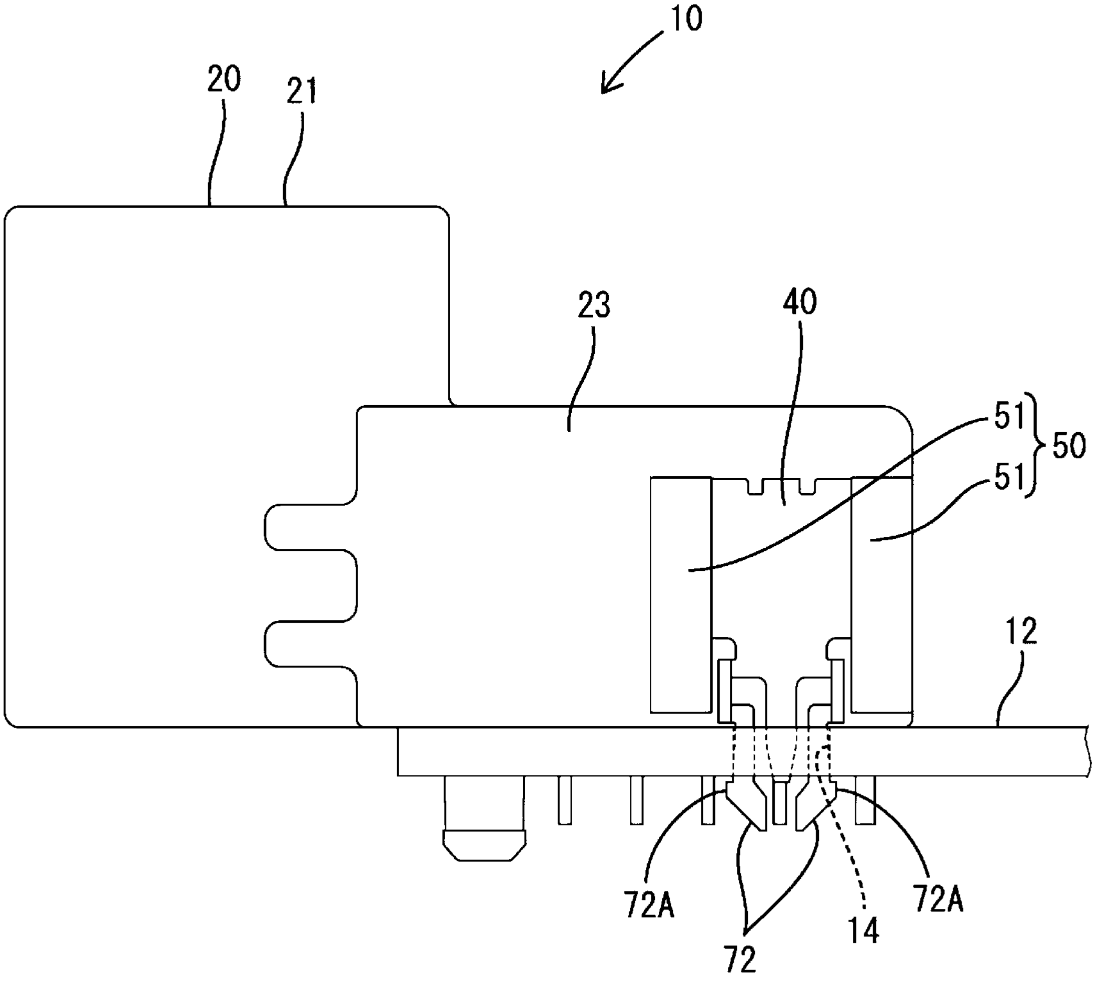
FIG. 4 is a right side view showing the state where the board connector is fixed to the circuit board.

A specific embodiment of a board connector of the present disclosure is described below with reference to FIGS. 1 to 12. Upper and lower sides shown in FIGS. 1, 2, 4 to 6 and 8 to 12 are directly defined as upper and lower sides concerning a vertical direction. Left and right sides shown in FIGS. 1 to 7 are respectively defined as front and rear sides concerning a front-rear direction. Sides behind and in front of the planes of FIGS. 4 and 7 are respectively defined as left and right sides concerning a lateral direction.

(Configuration of Connector)

A board connector 10 (hereinafter, merely referred to as the connector 10) of this embodiment is installed on a plate surface (surface) of a circuit board 12 as shown in FIGS. 1 to 4. The connector 10 is provided with a housing 20, a plurality of terminal fittings 31, 32 and a pair of fixing members 40. The housing 20 is connectable to a mating housing (not shown). The fixing members 40 are respectively provided on both left and right sides of the housing 20. The fixing members 40 are mounted on the circuit board 12 and fix the housing 20 to the circuit board 12.

(Configuration of Housing)

The housing 20 is, for example, made of synthetic resin. As shown in FIGS. 1 to 4, the housing 20 includes a receptacle 21 in the form of a rectangular tube open forward. As shown in FIG. 2, the receptacle 21 has a back wall 22 along the vertical direction. The back wall 22 is provided with a plurality of holes (not shown), which penetrate through the back wall 22 in the front-rear direction and into which the terminal fittings 31, 32 are press-fit.

As shown in FIGS. 1 to 4, protruding walls 23 protruding rearward from a rear end side of the receptacle 21 are provided on both left and right sides of the housing 20. A supporting portion 50 for supporting fixing member 40 is provided in the outer surface (surface on a side opposite to the other protruding wall 23) of the protruding wall 23. The supporting portion 50 has a thickness in a plate thickness direction (lateral direction) of a housing mounting portion 60 with the fixing member 40 assembled. The supporting portion 50 includes a pair of receiving portions 51 for supporting the fixing member 40 from both sides in the front-rear direction. The receiving portions 51 project from the outer surface of the protruding wall 23. The pair of receiving portions 51 are separated in the front-rear direction.

Figure 6:
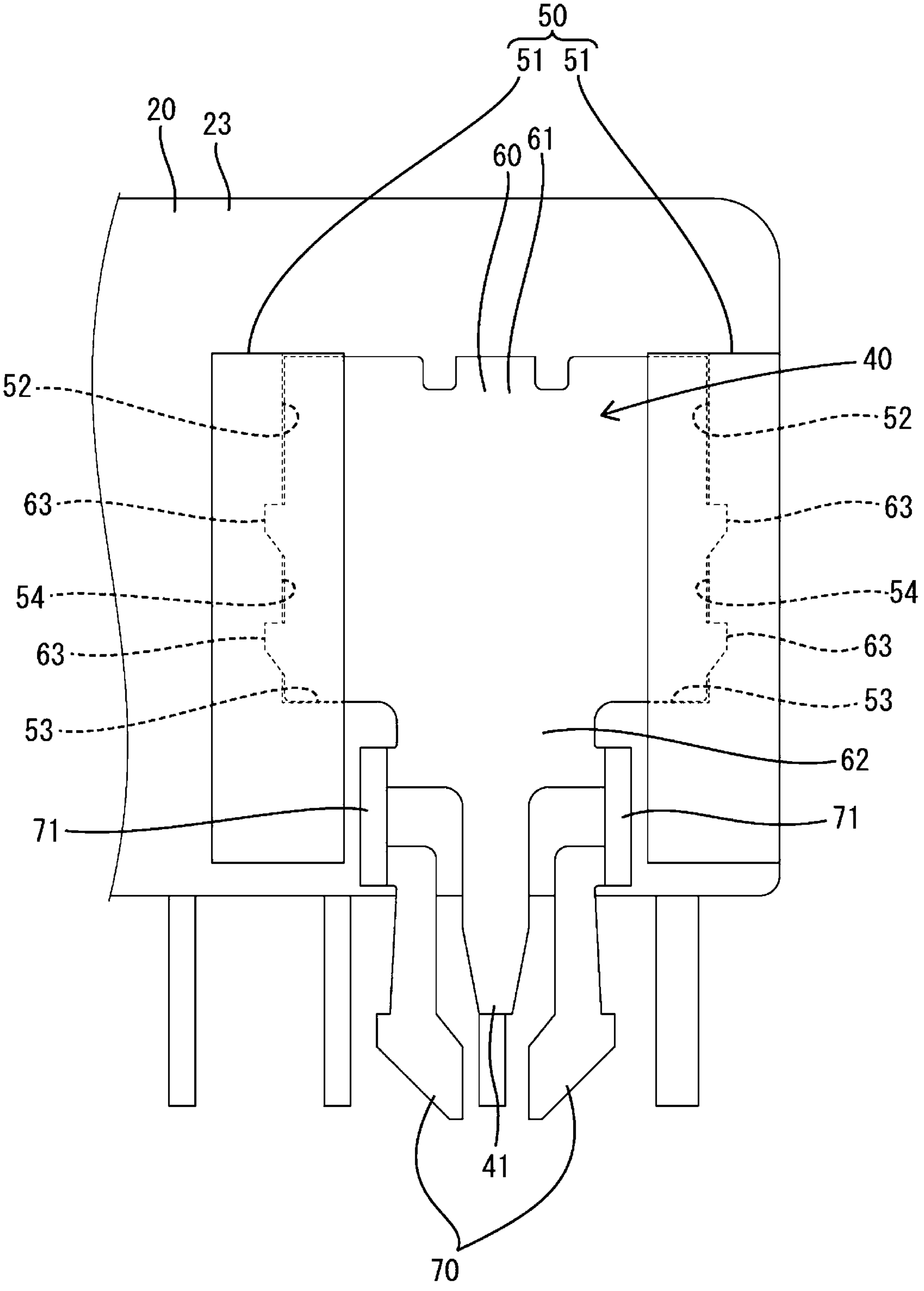
FIG. 6 is an enlarged view enlargedly showing the fixing member of FIG. 5 and the periphery of the fixing member.
Figure 7:
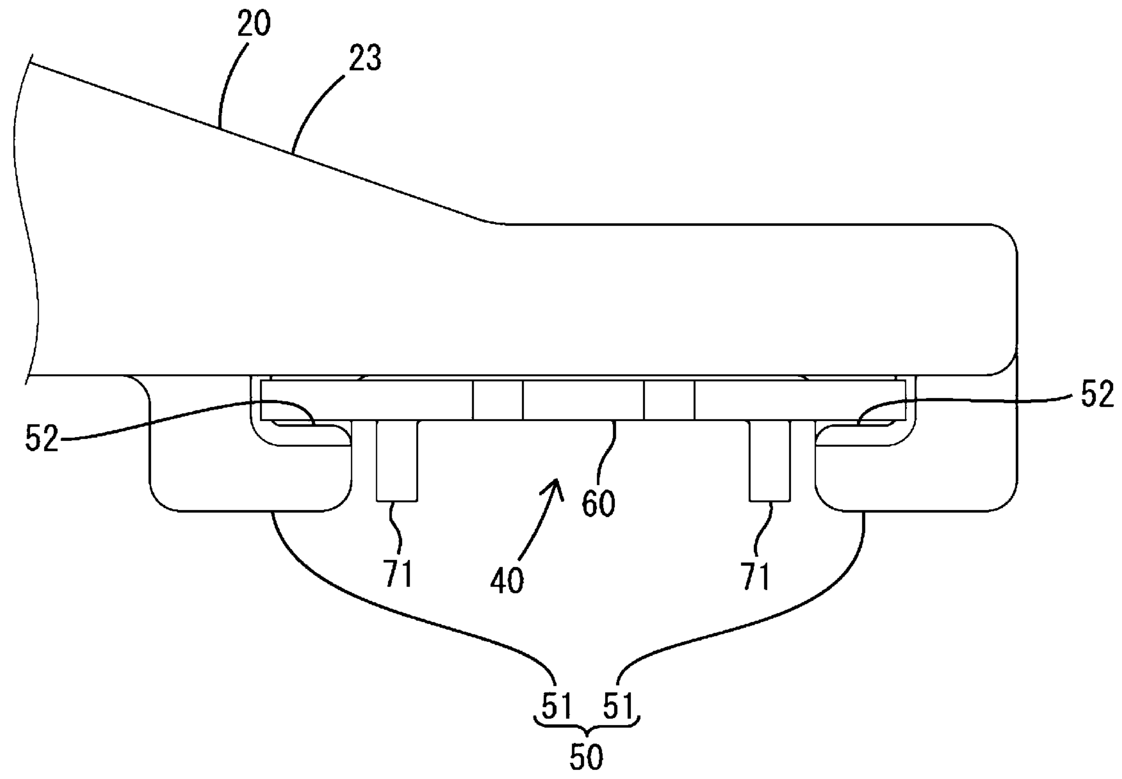
FIG. 7 is a plan view enlargedly showing the fixing member and the periphery thereof in the state where the fixing member is mounted in the circuit board.

As shown in FIGS. 6 and 7, a groove portion 52 is provided on an inner side (side of the other receiving portion 51) of the receiving portion 51. The groove portion 52 is recessed outward (side opposite to the other receiving portion 51) in the front-rear direction. The groove portion 52 is open inward in the front-rear direction and upward. The groove portion 52 is provided with a stop contact surface 53, with which the later-described housing mounting portion 60 (more specifically, an upper plate portion 61) of the fixing member 40 is stopped in contact. The stop contact surface 53 is constituted by a bottom surface along the front-rear direction. The groove portion 52 is provided with a receiving surface 54 for receiving a later-described pair of locking portions 63 of the fixing member 40. The receiving surface 54 is constituted by a side surface along the vertical direction.

(Configuration of Terminal Fittings)

The terminal fittings 31, 32 are, for example, configured as male terminal fittings as shown in FIG. 1. The terminal fittings 31, 32 are made of electrically conductive metal and elongated like tabs. The terminal fittings 31 are thicker than the terminal fittings 32. The terminal fitting 31, 32 is bent at a halfway position in an extending direction and composed of a front part extending in the front-rear direction and a rear part extending in the vertical direction. The front part of the terminal fitting 31, 32 is electrically connected to a mating terminal fitting (not shown) mounted in the mating housing (not shown) at the time of connection to the mating housing. A lower part of the terminal fitting 31, 32 is inserted into a through hole 13 (see FIG. 2) provided in the circuit board 12 and electrically connected to an electrically conductive portion of the circuit board 12 by soldering.

(Configuration of Fixing Members)

The fixing members 40 are made of metal and, as shown in FIGS. 8 to 11, in the form of flat plates as a whole. As shown in FIGS. 1 to 3, the fixing members 40 are respectively mounted on both sides of the housing 20. Both plate surfaces of the fixing member 40 are flush and continuous from the housing mounting portion 60 to board locking portions 70 and formed to be flat except at spring portions 71 to be described later.

As shown in FIGS. 8 to 11, the fixing member 40 includes the housing mounting portion 60, a pair of the board locking portions 70 and a projecting piece 41. The housing mounting portion 60 is a part to be mounted into the housing 20. The board locking portions 70 project from the housing mounting portion 60. The board locking portions 70 are resiliently deformable and locked to the circuit board 12. The projecting piece 41 projects downward from a part of the housing mounting portion 60 between the pair of board locking portions 70.

Figure 8:
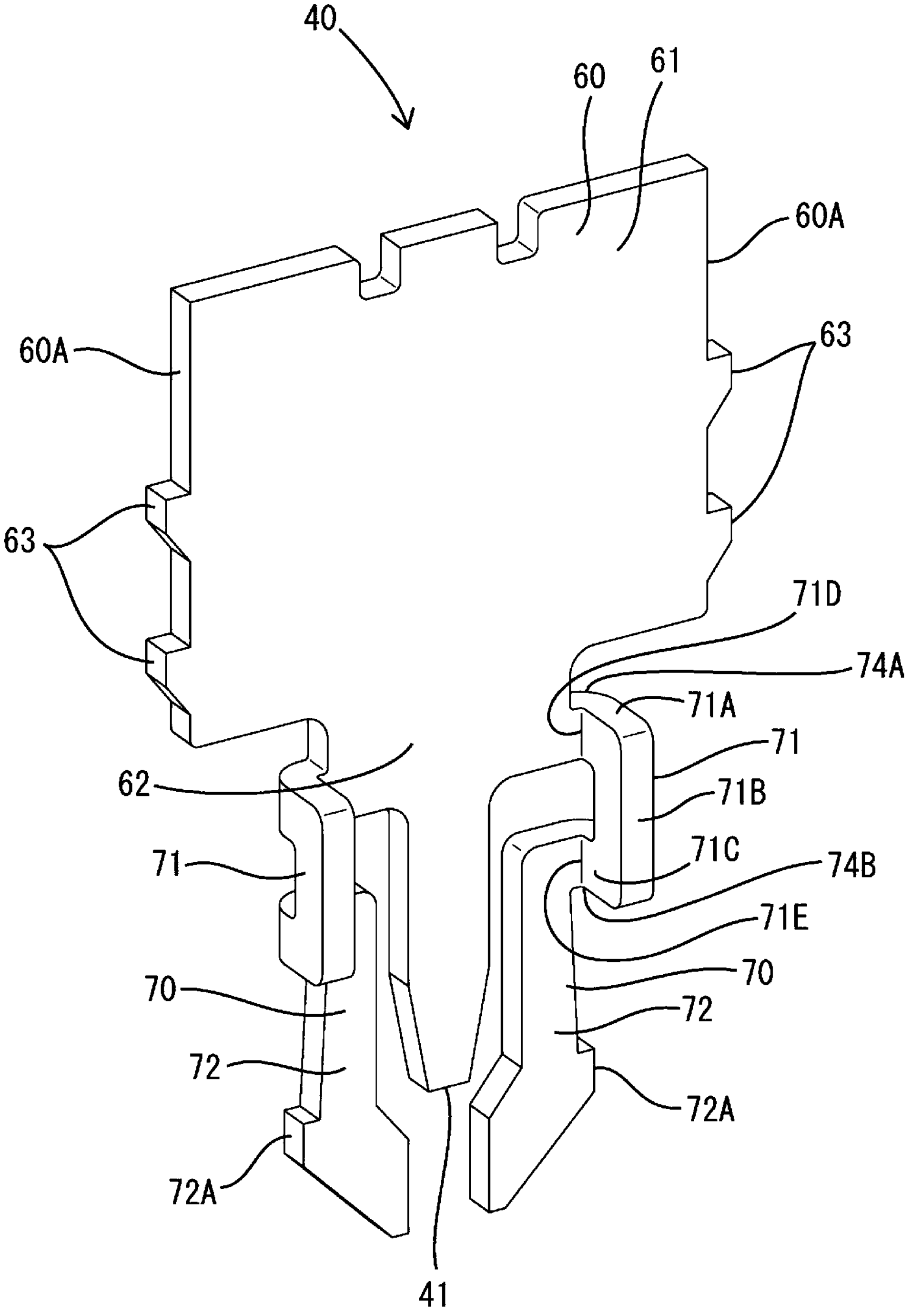
FIG. 8 is a perspective view of the fixing member of the embodiment.
Figure 9:
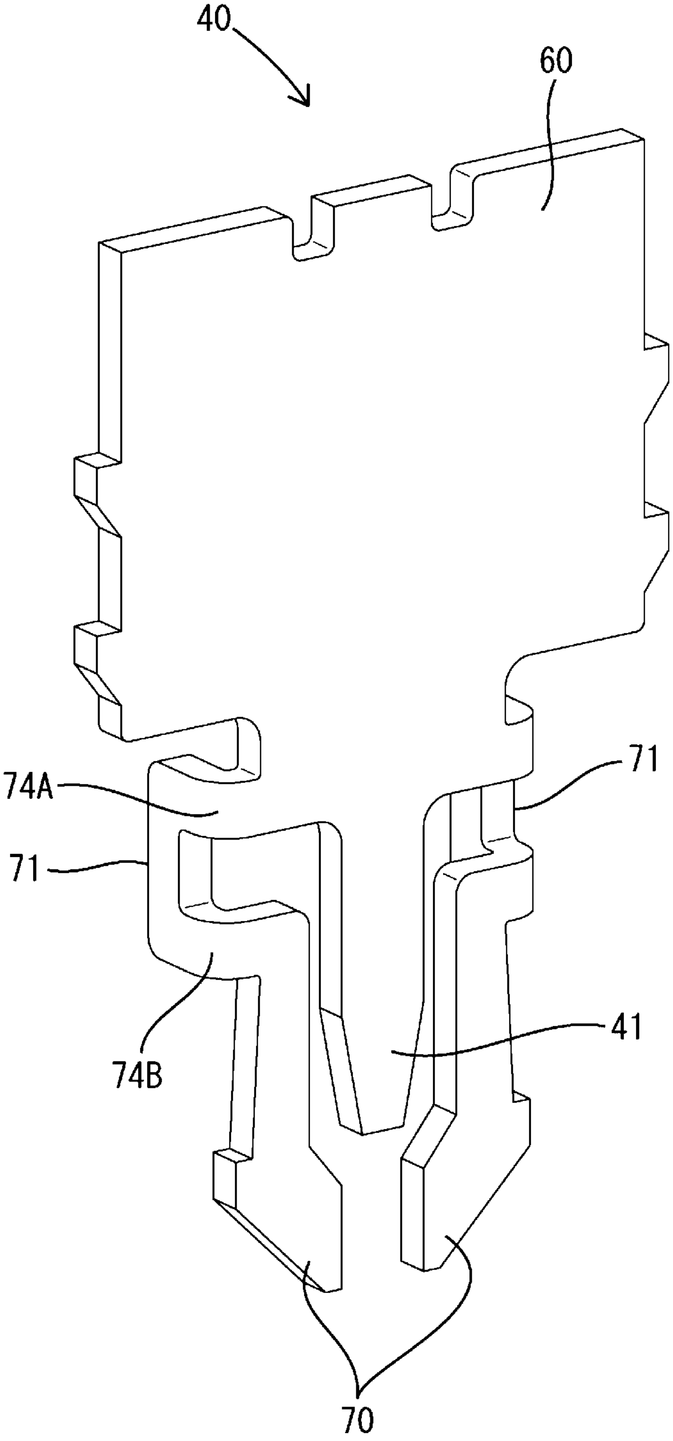
FIG. 9 is a perspective view of the fixing member viewed from a side opposite to that of FIG. 8.

As shown in FIG. 8, the housing mounting portion 60 includes the upper plate portion 61, a lower plate portion 62 and a plurality of the locking portions 63. The upper plate portion 61 has a rectangular shape long in a plate width direction. The plate width direction is the front-rear direction in a state where the fixing member 40 is mounted in the housing. The lower plate portion 62 has a rectangular shape smaller in size than the upper plate portion 61 and long in the plate width direction. The lower plate portion 62 protrudes from a center of the lower end of the upper plate portion 61. Two locking portions 63 are provided on each of both sides in the front-rear direction (plate width direction) of the upper plate portion 61. As shown in FIG. 6, the locking portions 63 enter the corresponding receiving portions 51 and are received thereby. As shown in FIG. 7, the housing mounting portion 60 is arranged along the outer surface of the protruding wall 23.

Figure 10:
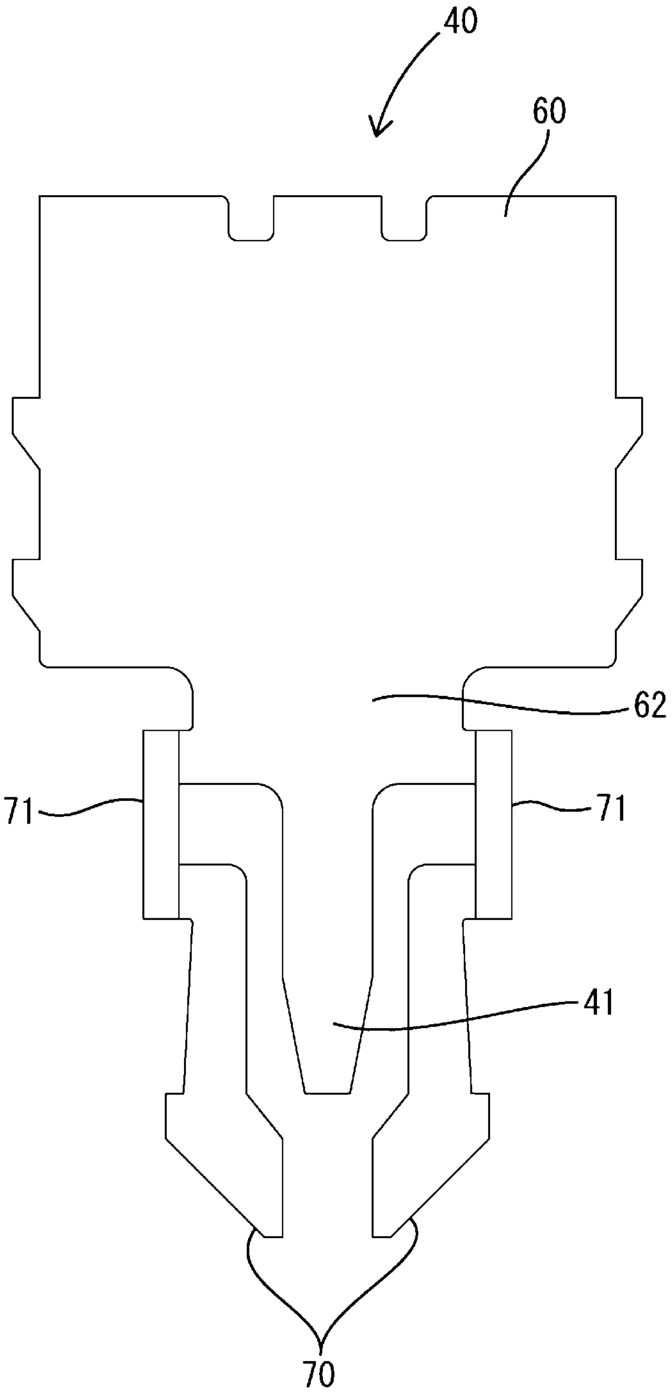
FIG. 10 is a front view of the fixing member.

As shown in FIG. 10, the pair of board locking portions 70 respectively project downward from the housing mounting portion 60 (both sides in the plate width direction of the lower plate portion 62). The respective board locking portions 70 are shaped to be symmetrical with each other in the plate width direction. The pair of board locking portions 70 are arranged side by side in the plate width direction. As shown in FIG. 4, the board locking portions 70 are inserted into a hole 14 of the circuit board 12 and locked to the hole 14.

Figure 12:
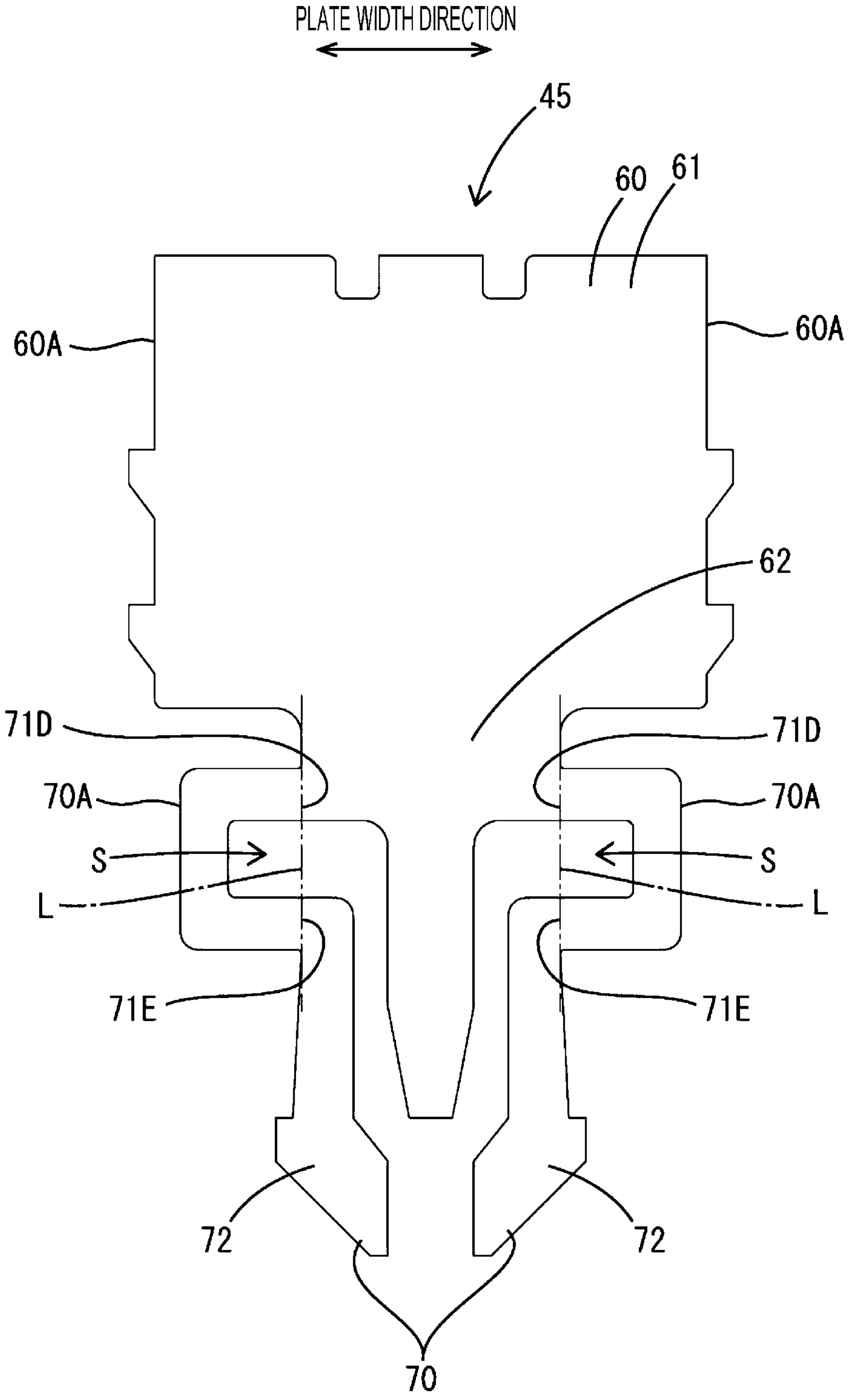
FIG. 12 is a front view showing a developed state of the fixing member.

As shown in FIG. 8, the board locking portion 70 includes a spring portion 71 and a board contact portion 72. The spring portion 71 is resiliently deformable. The spring portion 71 is formed by bending a part (protruding portion 70A) of the board locking portion 70 protruding in the plate width direction intersecting a projecting direction (vertical direction) from the housing mounting portion 60. As shown in FIG. 12, the protruding portion 70A projects outward in the plate width direction from the lower plate portion 62 in a developed state (flat plate portion 45) of the fixing member 40. The protruding portion 70A protrudes to have a detour shape in the plate width direction in the developed state of the fixing member 40 before being bent. The detour shape in the plate width direction is a shape to detour in the plate width direction by avoiding a space S (see FIG. 12) below the housing mounting portion 60 without linearly projecting in the projecting direction (vertical direction) of the board locking portion 70. The protruding portion 70A has a U shape convex outward in the plate width direction (toward a side opposite to the other board locking portion 70).

As shown in FIG. 12, the protruding portions 70A are arranged inwardly in the plate width direction of both end parts 60A on outer sides in the plate width direction of the housing mounting portion 60 in the developed state before being bent. In this way, the board locking portions 70 are located within a formation range of the housing mounting portion 60 in the plate width direction. Thus, a size of the fixing member 40 in the developed state can be reduced and material cot can be reduced.

By using the protruding portion 70A protruding to have the detour shape in the plate width direction in the spring portion 71, a spring length can be increased. By forming the spring portion 71 by bending such a protruding portion 70A, a spring restoring force of the spring portion 71 can be increased. As just described, the fixing member 40 can increase the spring restoring force while reducing the material cost as described above.

The spring portions 71 are formed by being bent and raised from the planar flat plate portion 45 (see FIG. 12) including the housing mounting portion 60 and the board locking portions 70. Thus, the fixing member 40 can be formed by bending the spring portions 71 from the flat plate-like member (flat plate portion 45), wherefore a manufacturing process is simplified.

Figure 11:
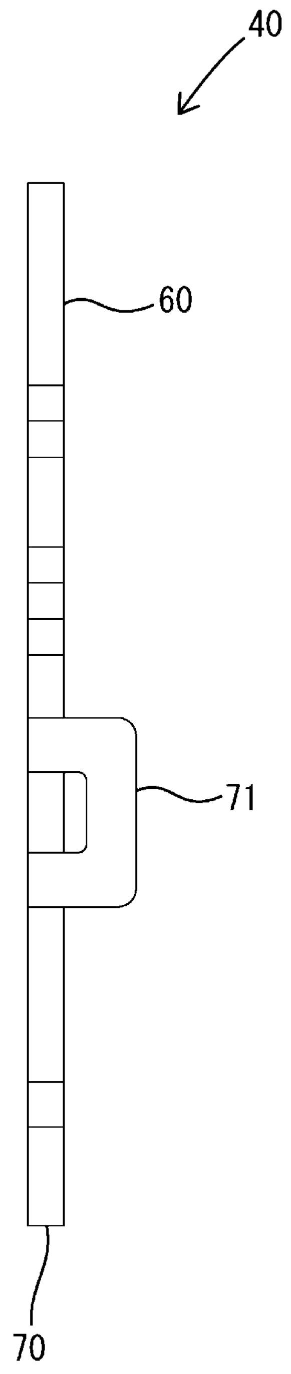
FIG. 11 is a side view of the fixing member.

The spring portion 71 is formed by being bent and raised in the plate thickness direction in the flat plate portion 45 (see FIG. 12). The both spring portions 71 are bent and raised toward the same side in the plate thickness direction. Plate surfaces of the spring portion 71 are parallel to the plate thickness direction. As shown in FIG. 11, the spring portion 71 has a U shape convex in the plate thickness direction when viewed from the plate width direction (lateral direction). As shown in FIG. 8, the spring portion 71 is shaped to extend from one end (end part 71D) to the other end (end part 71E).

As shown in FIG. 8, the spring portion 71 includes a first constituent portion 71A, a second constituent portion 71B, a third constituent portion 71C and bent portions 74A, 74B. The first constituent portion 71A extends outward (side opposite to the lower plate portion 62) in the plate thickness direction from the lower plate portion 62 via the bent portion 74A. The second constituent portion 71B extends downward from an extending end part of the first constituent portion 71A. The third constituent portion 71C extends inward (toward the lower plate portion 62) in the plate thickness direction from the lower end of the second constituent portion 71B via the bent portion 74B.

The bent portions 74A, 74B are provided on both end parts 71D, 71E in an extending direction as shown in FIG. 8. The bent portions 74A, 74B are formed along a virtual line L (see FIG. 12) passing through the both end parts 71, 71E in the extending direction of the spring portion 71. As shown in FIG. 12, the virtual line L passes through a boundary between the lower plate portion 62 and the protruding portion 70A and a boundary between the protruding portion 70A and the board contact portion 72. The spring portion 71 is bent via the virtual line L. The virtual line L extends along the vertical direction (projecting direction of the board locking portion 70). One virtual line L is provided for one board locking portion 70. In this way, one spring portion 71 can be formed by one bending via the virtual line L and the manufacturing process can be simplified.

The board contact portion 72 contacts the circuit board 12. As shown in FIG. 8, the board contact portion 72 is disposed on a side closer to a tip in the projecting direction (vertical direction) of the board locking portion 70 than the spring portion 71. The board contact portion 72 extends downward from an end part on an inner side (side of the lower plate portion 62) in the plate thickness direction of the third constituent portion 71C. A hooking portion 72A wider than an upper end part is provided on the lower end of the board contact portion 72. The lower end of the hooking portion 72A is inclined to approach the inner side in the plate width direction (toward the other hooking portion 72A) toward bottom. As shown in FIG. 4, the hooking portion 72A is hooked to the hole 14 of the circuit board 12 to prevent the disengagement of the fixing member 40 from the circuit board 12.

Figure 5:
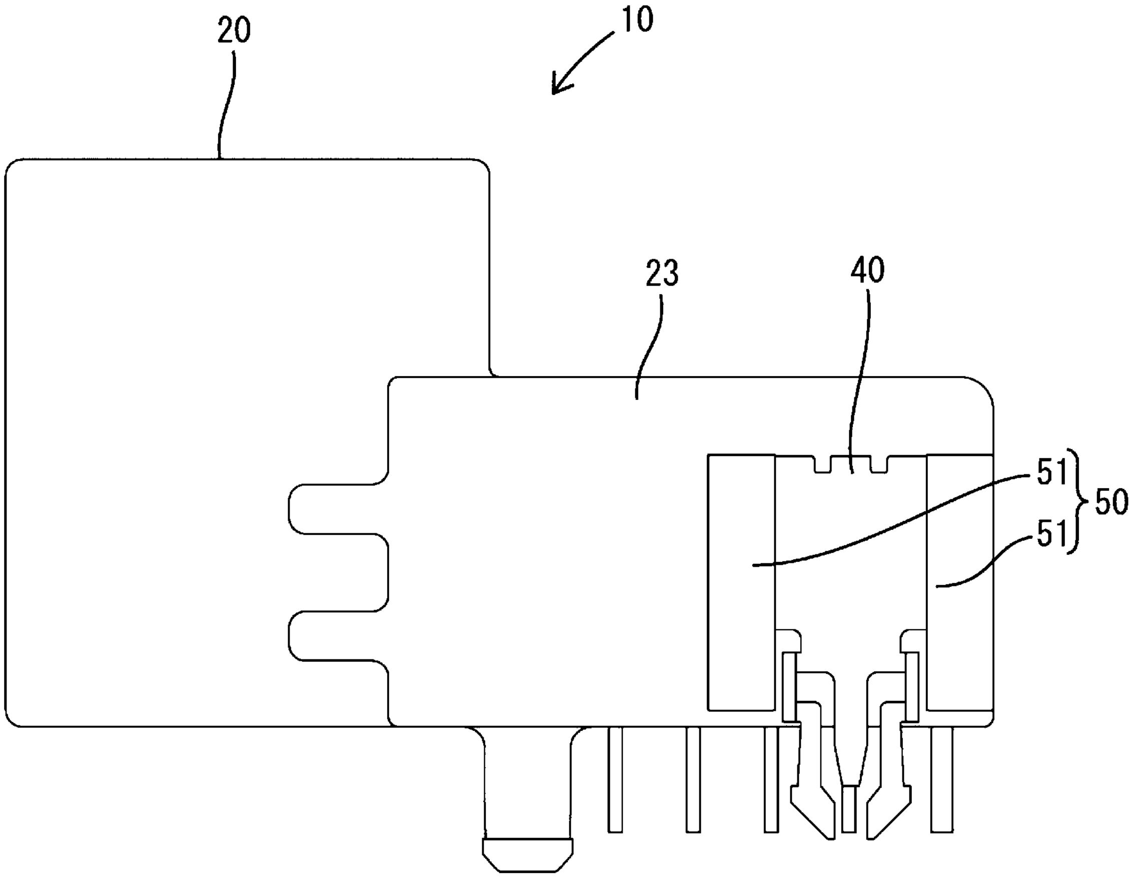
FIG. 5 is a right side view showing a state where a fixing member is mounted in the circuit board.

As shown in FIGS. 5 to 7, the fixing member 40 is so mounted in the housing 20 as to be supported in the supporting portion 50. The fixing member 40 is inserted into between the pair of receiving portions 51 from above. Both side parts in the plate width direction of the housing mounting portion 60 (more specifically, the upper plate portion 61) are respectively stopped in contact with the pair of stop contact surfaces 53. The pair of locking portions 63 are locked to the receiving surfaces 54.

As shown in FIG. 7, the housing mounting portion 60 is arranged in parallel to the vertical direction and front-rear direction along the outer surface (surface on a side opposite to the other protruding wall 23) of the protruding portion 23. As shown in FIG. 6, the upper end of the fixing member 40 is at the same height as the upper ends of the respective receiving portions 51. The lower plate portion 62, the pair of board locking portions 70 and the projecting piece 41 are located between the pair of receiving portions 51 in the lateral direction. The front and rear spring portions 71 are respectively slightly separated from the front and rear receiving portions 51. The pair of spring portions 71 do not project further downward than the protruding wall 23. The pair of board locking portions 70 and the projecting piece 41 project further downward than the protruding wall 23.

As shown in FIG. 7, the spring portions 71 are disposed in a thickness range of the supporting portion 50 in the plate thickness direction (lateral direction) of the housing mounting portion 60. That is, the spring portions 71 do not project further outward in the lateral direction than the supporting portions 50. In this way, an increase in the size of the connector 10 in the lateral direction can be prevented.

(Effects of Embodiment)

Since the spring portions 71 are arranged inwardly in the width direction of the both end parts 60A on the outer sides in the width direction of the housing mounting portion 60 in the developed state in the fixing member 40 of the embodiment, the size of the fixing member 40 can be reduced. Therefore, the material cost of the fixing member 40 can be reduced.

Further, the spring portion 71 is formed to extend from the one end (end part 71D) to the other end (end part 71E) and includes the bent portions 74A, 74B on the both end parts 71D, 71E in the extending direction. In this way, the spring portion 71 is more easily deflected and deformed.

Further, the bent portions 74A, 74B are formed along the virtual line L passing through the end parts 71D, 71E in the extending direction of the spring portion 71. In this way, the bent portions 74A, 74B of the spring portion 71 can be formed by one bending via the virtual line L, and the manufacturing process can be simplified.

Further, the spring portions 71 are bent and raised from the planar flat plate portion 45 including the housing mounting portion 60 and the board locking portions 70. That is, since the fixing member 40 can be formed by bending the spring portions 71 from the flat plate-like member (flat plate portion 45), the manufacturing process is simplified.

Further, the spring portions 71 are disposed in the thickness range of the supporting portion 50 in the plate thickness direction of the housing mounting portion 60. In this way, the spring portions 71 do not project further outward than the supporting portion 50, wherefore the size of the connector 10 can be reduced.

[Other Embodiments]

In the above embodiment, the spring portion 71 may have an arcuate detour shape.

Although the spring portion 71 is bent on both ends (end parts 71D, 71E) in a length direction of the detouring protruding portion 70A in the above embodiment, the spring portion 71 may be bent outside the both ends (end parts 71D, 71E) in the plate width direction. That is, the spring portion 71 may be bent at a halfway position in the length direction of the first constituent portion 71A and a halfway position in the length direction of the second constituent portion 71B.

Although the spring portion 71 is bent in the plate thickness direction of the housing mounting portion 60 in the above embodiment, the spring portion 71 may be bent to incline toward one side in the plate width direction.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims

What is claimed is:

1. A fixing member, comprising:

a planar plate portion that is formed of a flat plate and includes an upper plate portion and a lower plate portion extending from the upper plate portion in a projecting direction, the lower plate portion being narrower than the upper plate portion in a width direction intersecting the projecting direction; and a spring portion that is resiliently deformable and shaped by bending a part of the lower plate portion away from a continuous plane of the planar plate portion, the part of the lower plate portion occurring at two end parts of the planar plate portion disposed on either side of the lower plate portion in the width direction, the planar plate portion including:

a housing mounting portion to be mounted into a housing; and a board locking portion projecting from the housing mounting portion, the board locking portion configured to be locked to a circuit board, the spring portion being arranged inwardly in the width direction of outer sides in the width direction of the housing mounting portion in a developed state of the spring portion, and the housing mounting portion and the board locking portion being flush and occupying the continuous plane in the developed state of the spring portion.

2. The fixing member of claim 1, wherein the spring portion is shaped to extend from one of the two end parts to another of the two end parts and includes bent portions on each of the two end parts in an extending direction.

3. The fixing member of claim 2, wherein the bent portions are formed along a virtual line passing through the two end parts in the extending direction of the spring portion.

4. A board connector, comprising:

the fixing member of claim 1; and the housing, the housing including a protruding wall that is disposed on a lateral side of the housing and protrudes rearward from the housing, and a supporting portion for supporting the fixing member, the supporting portion including a pair of receiving portions that protrude from a lateral side of the protruding wall and are configured to receive the housing mounting portion of the fixing member, each of the pair of receiving portions having a thickness in a plate thickness direction of the housing mounting portion with the fixing member assembled, and the spring portion being disposed in a thickness range of the supporting portion in the plate thickness direction of the housing mounting portion.

5. The fixing member of claim 1, wherein the board locking portion includes the spring portion and a board contact portion, and the board contact portion is disposed closer to a tip of the board locking portion than the spring portion in the projecting direction, the board contact portion configured to contact the circuit board.

6. The fixing member of claim 1, wherein the spring portion is raised from the two end parts of the planar plate portion such that the spring portion extends from the planar plate portion in a plate thickness direction of the lower plate portion and such that the spring portion has a U shape that is convex in the plate thickness direction of the lower plate portion.

7. The fixing member of claim 6, wherein the U shape of the spring portion is connected to the two end parts of the planar plate portion such that plate surfaces of the spring portion are parallel to the plate thickness direction.

8. The fixing member of claim 1, wherein the spring portion extends in a plate thickness direction of the lower plate portion and includes a first constituent portion, a second constituent portion, a third constituent portion, and two bent portions connecting the first and second constituent portions to the lower plate portion, the first constituent portion extends in the plate thickness direction from the lower plate portion via one of the two bent portions, the second constituent portion extends between the first constituent portion and the third constituent portion, and the third constituent portion extends in the plate thickness direction from the lower plate portion via the other of the two bent portions.

* * * * *